United States Patent
Lee et al.

(10) Patent No.: US 11,258,220 B2
(45) Date of Patent: Feb. 22, 2022

(54) POSITIONING STRUCTURE AND ENERGY STORAGE DEVICE

(71) Applicant: Merry Electronics(Shenzhen) Co., Ltd., ShenZhen (CN)

(72) Inventors: Wen-Chung Lee, Taichung (TW);
Hsiang-Sen Chang, Taichung (TW);
Feng-Ping Chang, Taichung (TW)

(73) Assignee: Merry Electronics (Shenzhen) Co., Ltd., ShenZhen (CN)

( * ) Notice: Subject to any disclaimer, the term of this patent is extended or adjusted under 35 U.S.C. 154(b) by 625 days.

(21) Appl. No.: 16/182,625

(22) Filed: Nov. 7, 2018

(65) Prior Publication Data

US 2019/0181601 A1    Jun. 13, 2019

Related U.S. Application Data

(60) Provisional application No. 62/598,449, filed on Dec. 13, 2017.

(30) Foreign Application Priority Data

Jul. 24, 2018   (TW) ................... 107125564

(51) Int. Cl.
*H01R 33/97*   (2006.01)
*H01M 50/20*   (2021.01)
*H01R 13/631*  (2006.01)

(52) U.S. Cl.
CPC ............ *H01R 33/97* (2013.01); *H01M 50/20* (2021.01); *H01M 2220/30* (2013.01); *H01R 13/631* (2013.01)

(58) Field of Classification Search
CPC .... H01M 50/20; H01M 2220/30; H01R 33/97
See application file for complete search history.

(56) References Cited

U.S. PATENT DOCUMENTS

| | | | |
|---|---|---|---|
| 2008/0146067 A1* | 6/2008 | Shinozaki | H01R 13/62938 439/345 |
| 2011/0101794 A1* | 5/2011 | Schroeder | H01M 50/209 307/150 |
| 2019/0249637 A1* | 8/2019 | Nook | H01R 24/20 |

* cited by examiner

*Primary Examiner* — Sarah A. Slifka
*Assistant Examiner* — Patrick Marshall Greene
(74) *Attorney, Agent, or Firm* — JCIPRNET

(57) ABSTRACT

A positioning structure includes a first positioning component and a second positioning component. The first positioning component includes a first arched positioning portion having a first arched positioning surface. The second positioning component is disposed at one side of the first positioning component, wherein the second positioning component includes a second arched positioning portion having a second arched positioning surface. The second positioning component is configured to rotate relative to the first positioning component, such that the second arched positioning portion is moved to one side of the first arched positioning portion. The second arched positioning surface abuts against the first arched positioning surface, such that a degree of freedom of movement of the second positioning component in a direction is restricted by the first positioning component. An energy storage device is also provided.

17 Claims, 6 Drawing Sheets

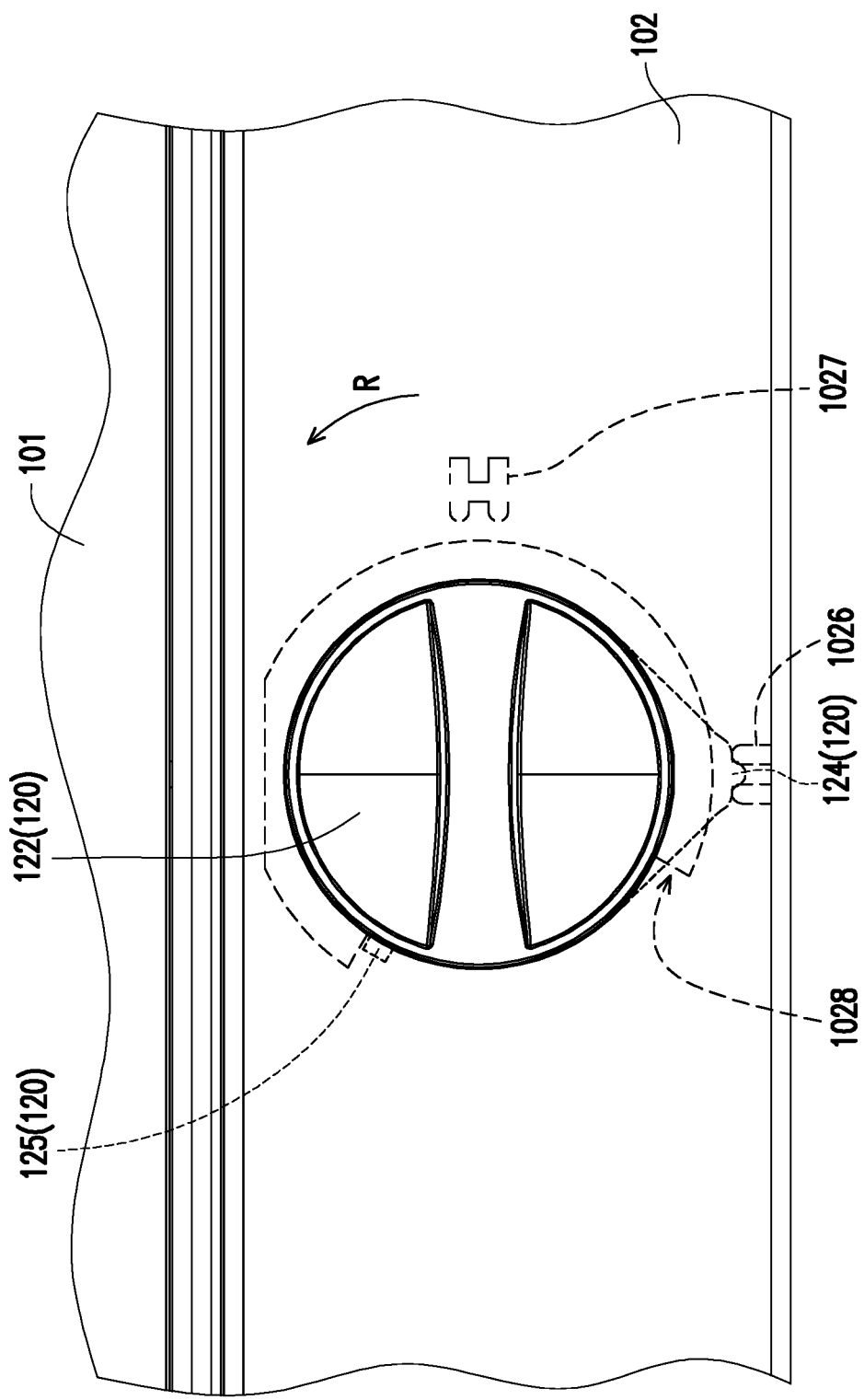

POSITIONING STRUCTURE AND ENERGY STORAGE DEVICE

CROSS-REFERENCE TO RELATED APPLICATION

This application claims the priority benefit of U.S. provisional application Ser. No. 62/598,449, filed on Dec. 13, 2017 and a Taiwan application serial no. 107125564, filed on Jul. 24, 2018. The entirety of each of the above-mentioned patent applications is hereby incorporated by reference herein.

BACKGROUND OF THE DISCLOSURE

1. Field of the Disclosure

The disclosure relates to a positioning structure and an energy storage device, and more particularly to a positioning structure and an energy storage device using the same.

2. Description of Related Art

Energy storage devices such as a portable battery or a handheld battery are easy for a user to carry, and the user may use the needed electricity timely and ubiquitously; therefore, the energy storage devices become increasingly popular. However, after the portable battery or handheld battery is used continuously for some time, the electricity is running out. For this reason, a backup power set (e.g., an expanded power) that may be combined with a main power set of the portable battery or handheld battery is then introduced. In this way, the user may carry at least one backup battery set (e.g., the expanded power set). In such cases, the user may combine the backup power set (e.g., the expanded power set) with the main power set to allow the backup power set (e.g., the expanded power set) to transport the electricity to the main power set and then allow the main power set to transport the electricity to an external device when the electricity of the main power set is insufficient.

Generally, the main power set is equipped with a first hook, and the backup power set (e.g., the expanded power set) is equipped with a second hook corresponding to the first hook. The backup power set (e.g., the expanded power set) can be fixed to the main power set through engagement between the first hook and the second hook. However, after long years of use, the strength and reliability of engagement between the first hook and the second hook would be influenced by the worn first hook or the worn second hook. On the other hand, a revolving cantilever hook has been introduced, the revolving cantilever hook is disposed at of one of the main power set and the backup power set (e.g., the expanded power set) and is configured to be cooperated with a hook structure disposed at the other of the main power set and the backup power set (e.g., the expanded power set); however, a contact area where the revolving cantilever hook engages the hook structure is too small, and the contact area deviates relative to a rotating axis of the revolving cantilever hook. Thus, engagement between the revolving cantilever hook and the hook structure becomes easily loose, or the revolving cantilever hook would easily break.

SUMMARY OF THE DISCLOSURE

The disclosure provides a positioning structure and an energy storage device which are easy to use and have excellent reliability.

The energy storage device according to the disclosure includes a main power set, a first positioning component, an expanded power set and a second positioning component. The first positioning component is disposed in the main power set and includes a first arched positioning portion having a first arched positioning surface. The expanded power set is configured to be assembled to the main power set. The second positioning component is pivoted to the expanded power set and includes a second arched positioning portion having a second arched positioning surface. The second positioning component is configured to rotate relative to the expanded power set to allow the second arched positioning component to move into the main power set and move to one side of the first arched positioning portion. A contour of the second arched positioning surface complements a contour of the first arched positioning surface, and the second arched positioning surface abuts against the first arched positioning surface. Thus, a degree of freedom of movement of the second positioning component in a direction is restricted by the first positioning component.

In one embodiment of the disclosure, a center of curvature of the first arched positioning surface is the same as a center curvature of the second arched positioning surface.

In one embodiment of the disclosure, the center of curvature of the first arched positioning surface and the center of curvature of the second arched positioning surface are located on a pivoting axis of the second positioning component.

In one embodiment of the disclosure, the first arched positioning surface is a convex arc surface, and the second arched positioning surface is a concave arc surface.

In one embodiment of the disclosure, a normal force applied to the first arched positioning surface by the second arched positioning surface extends through the pivoting axis of the second positioning component.

In one embodiment of the disclosure, a contact area of the second arched positioning surface and the first arched positioning surface accounts for at least 40% of a surface area of the first arched positioning surface.

In one embodiment of the disclosure, the energy storage device further includes a switch disposed in the main power set and located at one side of the first arched positioning portion. The switch is configured to be triggered by the second arched positioning portion.

In one embodiment of the disclosure, the second positioning component further includes a knob and an extending portion. The knob is pivoted to the expanded power set and connected with the second arched positioning portion through the extending portion. The extending portion is configured to rotate relative to the expansion power set with the knob such that at least a portion of the extending portion moves into the main power set.

In one embodiment of the disclosure, the second positioning component further includes a first limiting portion located in the expanded power set. The expanded power set includes two second limiting portions disposed corresponding to the first limiting portion. The first limiting portion is configured to engage any of the second limiting portions to restrict a degree of freedom of rotation of the second positioning component rotating relative to the expanded power set.

In one embodiment of the disclosure, the second positioning component further includes a third limiting portion located in the expanded power set. The expanded power set further includes a fourth limiting portion. The third limiting portion is slidably disposed in the fourth limiting portion to determine a rotary stroke of the second positioning component rotating relative to the expanded power set.

In one embodiment of the disclosure, the expanded power set includes an accommodating trench configured to accommodate at least one portion of the second positioning component.

In one embodiment of the disclosure, the main power set includes a first electrical port, and the expanded power set includes a second electrical port. The first electrical port and the second electrical port are configured to be combined with each other to electrically connect the main power set and the expanded power set.

In one embodiment of the disclosure, the main power set includes a first guiding portion, and the expanded power set includes a second guiding portion. The first guiding portion and the second guiding portion are configured to be cooperated with each other to guide the assembly of the main power set and the expanded power set.

The positioning structure of the disclosure includes the first positioning component and the second positioning component. The first positioning component includes the first arched positioning portion having the first arched positioning surface. The second positioning component is disposed at one side of the first positioning component and includes the second arched positioning portion having the second arched positioning surface. The second positioning component is configured to rotate relative to the first positioning component to allow the second arched positioning portion to move to one side of the first arched positioning portion. The contour of the second arched positioning surface complements the contour of the first arched positioning surface, and the second arched positioning surface abuts against the first arched positioning surface. A degree of freedom of movement of the second positioning component in a direction is restricted by the first positioning component.

In view of the above, the energy storage device according to the disclosure includes the main power set and the expanded power set which can be fixed to each other through the positioning structure. According to the design and coordination of the arched contours of the first positioning component and the second positioning component in the positioning structure, it is possible to prevent the first positioning component and the second positioning component engaged with each other from being detached from each other to enhance the assembly reliability of the main power set and the expanded power set.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 3A is a schematic partially enlarged side view of the energy storage device of FIG. 2.

DESCRIPTION OF THE EMBODIMENTS

Figure 1:
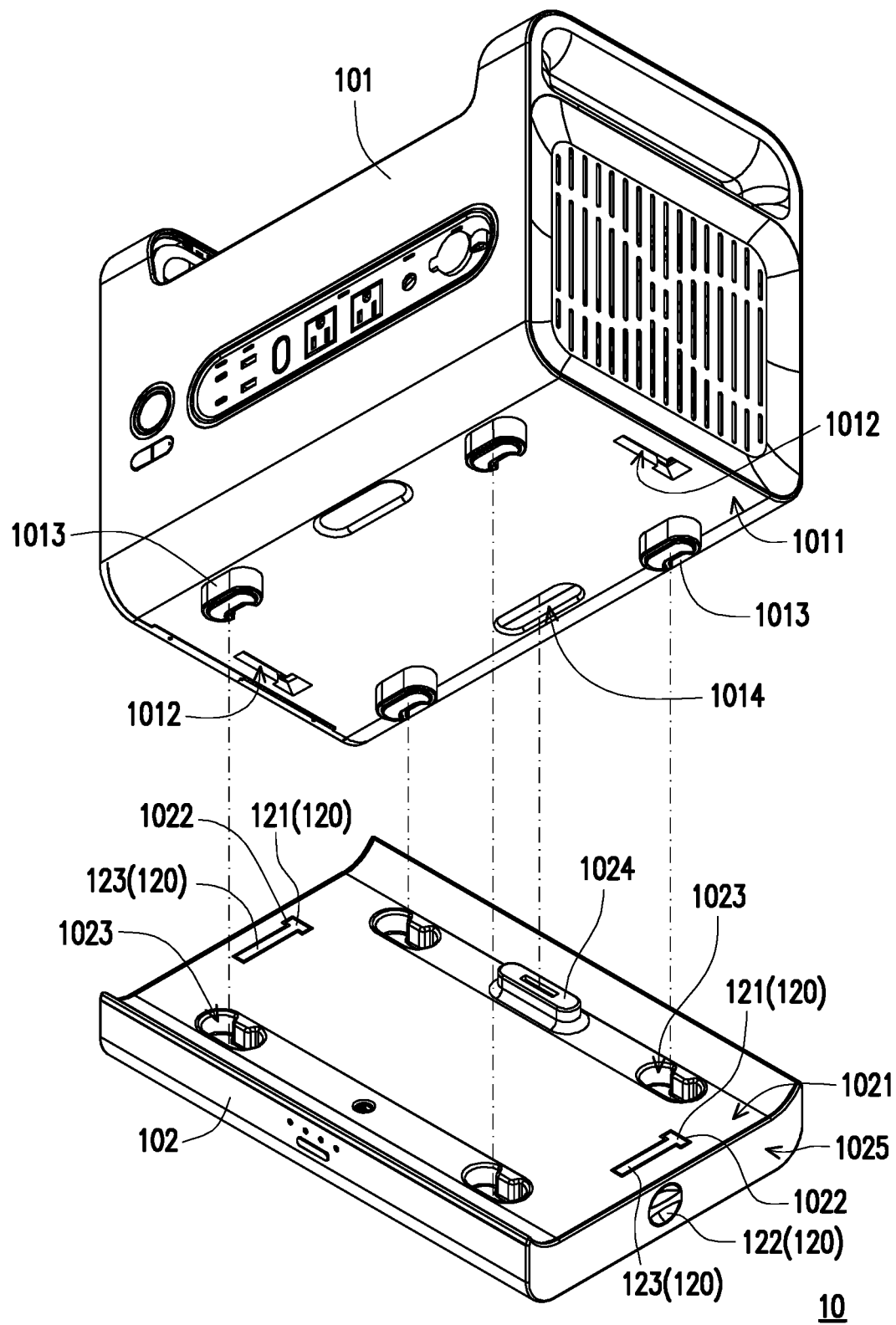
FIG. 1 is a schematic exploded view of an energy storage device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
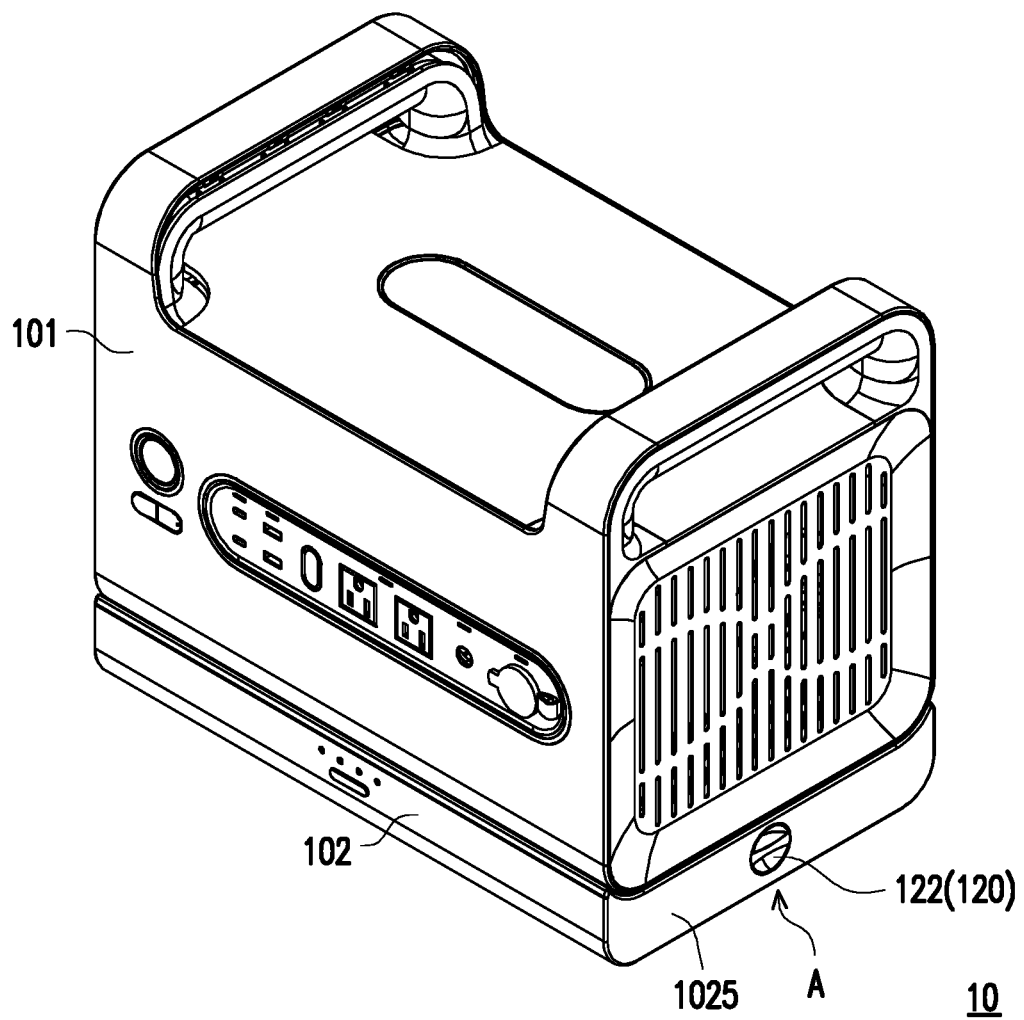
FIG. 2 is a schematic perspective view of the energy storage device of FIG. 1.
Figure 3B:
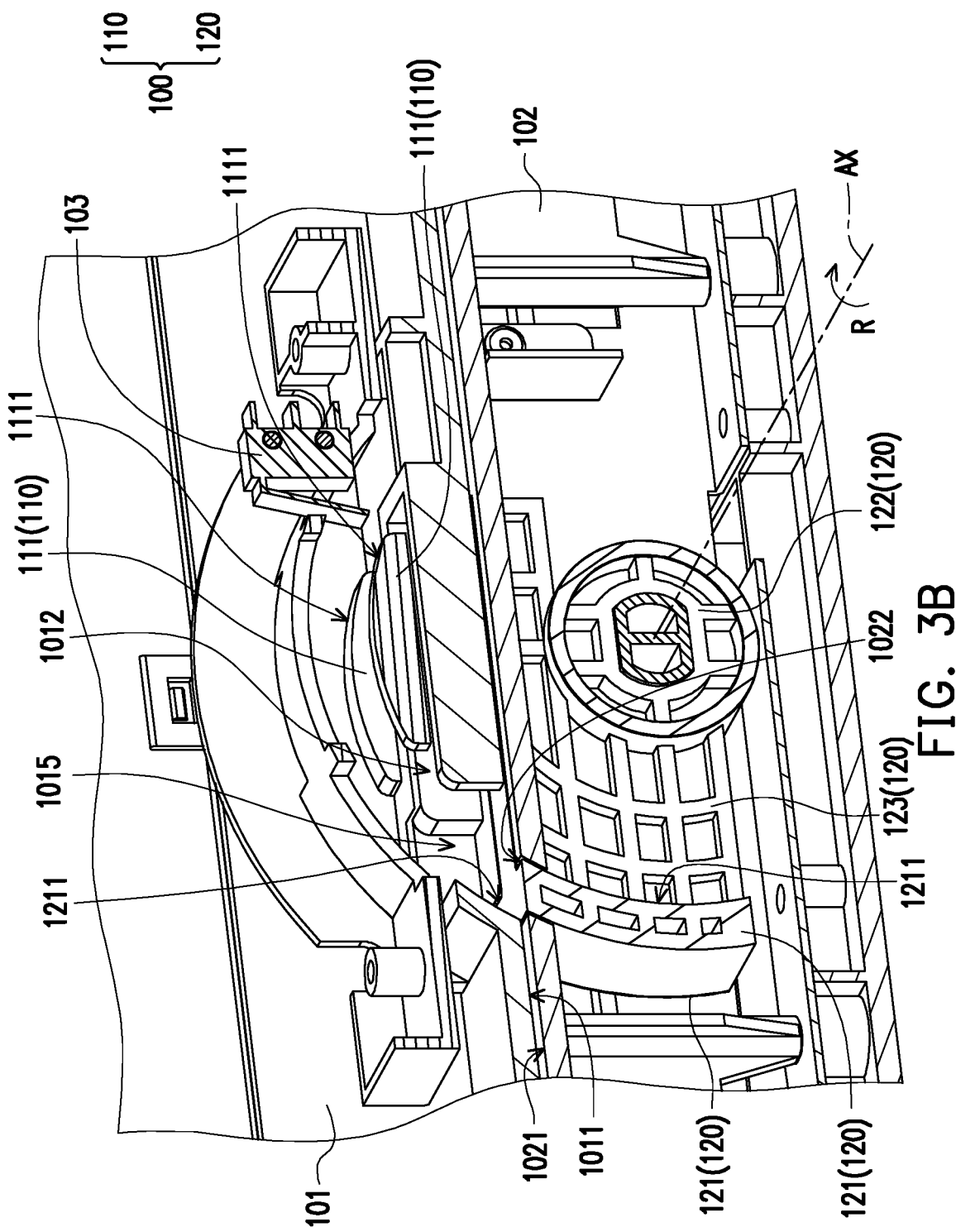
FIG. 3B is a schematic partially enlarged cross-sectional view of the energy storage device of FIG. 2.

FIG. 1 is a schematic exploded view of an energy storage device according to an embodiment of the disclosure. FIG. 2 is a schematic perspective view of the energy storage device of FIG. 1. FIG. 3A is a schematic partially enlarged side view of the energy storage device of FIG. 2. FIG. 3B is a schematic partially enlarged cross-sectional view of the energy storage device of FIG. 2. It should be particularly noted that FIGS. 3A and 3B are partially enlarged side view and partially enlarged cross-sectional view corresponding to a region A of FIG. 2. Moreover, for clear illustration and easy descriptions, FIGS. 3A and 3B show the configurations and states of a first positioning component and 110 and a second positioning component 120 from two different view angles.

Referring to FIGS. 1, 2, 3A and 3B, in the embodiment, an energy storage device 10 includes a main power set 101 and an expanded power set 102. The energy storage device 10 is disposed with a positioning structure 100, and the main power set 101 and the expanded power set 102 may switch between a locked state and an unlocked state through the positioning structure 100 to be fixed to or detached from each other. In the states shown in FIGS. 2, 3A and 3B, the positioning structure 100 is in an unlocked state, and the main power set 101 is merely disposed in the expanded power set 102. A user may easily detach the main power set 101 from the expanded power set 102. Furthermore, the positioning structure 100 includes a first positioning component 110 disposed in the main power set 101 and a second positioning component 120 pivoted to the expanded power set 102.

A number of the positioning structure 100 may be at least two and be symmetrically disposed in the energy storage device 10. As shown in FIG. 1, the two second positioning components 120 are symmetrically disposed in the expanded power set 102, and a supporting surface 1021 of the expanded power set 102 configured to support the main power set 101 is disposed with at least two accommodating trenches 1022. In the unlocked state, at least a portion of each of the second positioning components 120 is accommodated in the corresponding accommodating trench 1022 and does not protrude out of the supporting surface 1021 for the purpose of a complete appearance. Further, each of the first accommodating trenches 1022 is substantially filled by the at least one portion of the corresponding second positioning component 120, and a portion of each of the second positioning components 120 that is exposed out of the accommodating trench 1022 is, for example, coplanar with the supporting surface 1021; therefore, it is not easy for water, dust or other foreign materials from the outside to enter the inside of the expanded power set 102 from the two accommodating trenches 1022.

On the other hand, a bottom 1011 of the main power set 101 is disposed with two penetrating grooves 1012 corresponding to the two accommodating trenches 1022. Each penetrating groove 1012 is disposed corresponding to one of the first positioning components 110, and each first positioning component 110 is disposed above the corresponding penetrating groove 1012. Thus, after the main power set 101 is placed on the expanded power set 102 to allow the bottom 1011 of the main power set 101 to abut against the supporting surface 1021 of the expanded power set 102, each penetrating groove 1012 is aligned to the corresponding accommodating trench 1022, and meanwhile, each first positioning component 110 is aligned to the corresponding second positioning component 120, as shown in FIGS. 1, 2 and 3B. To enhance assembly convenience for the user, the bottom 1011 of the main power set 101 is disposed with at least one first guiding portion 1013 (four first guiding portions 1013 are schematically illustrated), and the supporting surface 1021 of the expanded power set 102 is disposed with at least one second guiding portion 1023 (four second guiding portions 1023 are schematically illustrated). The first guiding portions 1013 are respectively disposed corresponding to the second guiding portions 1023 to be cooperated with each other to guide the assembly of the main power set 101 and the expanded power set 102. For example, the first guiding portions 1013 and the second guiding portions 1023 may be a combination of convex and concave structures.

On the other hand, the bottom 1011 of the main power set 101 is disposed with a first electrical port 1014, and the supporting surface 1021 of the expanded power set 102 is disposed with a second electrical port 1024. The first electrical port 1014 is disposed corresponding to the second electrical port 1024. After the main power set 101 is placed on the expanded power set 102 to allow the bottom 1011 of the main power set 101 to abut against the supporting surface 1021 of the expanded power set 102, the first electrical port 1014 and the second electrical port 1024 are combined with each other to electrically connect the main power set 101 and the expanded power set 102. For example, the first electrical port 1014 and the second electrical port 1024 may be a combination of a pin connector and a socket connector. It should be particularly noted that in the unlocked states shown in FIGS. 2, 3A and 3B, the electricity of the expanded power set 102 cannot be transported to the main power set 101 yet.

One group of the first positioning component 110 and the second positioning component 102 is described as follows. Referring to FIGS. 3A and 3B, the second positioning component 120 is disposed at one side of the first positioning component 110 and is configured to rotate relative to the expanded power set 102 and the first positioning component 110. Furthermore, the second positioning component 120 is pivoted to the expanded power set 102 along a pivoting axis AX (or called a rotating axis) and may rotate relative to the expanded power set 102 and the first positioning component 110 around the pivoting axis AX (or called the rotating axis).

In the embodiment, the first positioning component 110 includes a first arched positioning portion 111. A number of the first arched positioning portions 111 may be two, and the first arched positioning portions 111 are disposed side by side at two opposite sides of the penetrating groove 1012. Each first arched positioning portion 111 has a first arched positioning surface 1111. Each first arched positioning surface 1111 may be a convex arc surface, and a center of curvature of each first arched positioning surface 1111 is located on the pivoting axis AX (or called the rotating axis) of the second positioning component 120. On the other hand, the second positioning component 120 includes a second arched positioning portion 121. A number of the second arched positioning portions 121 may be two, and the second arched positioning portions 121 are respectively disposed corresponding to the two first arched positioning portions 111. Each second arched positioning portion 121 has a second arched positioning surface 1211. Each second arched positioning surface 1211 may be a concave arc surface, and a center of curvature of each second arched positioning surface $1211s$ is located on the pivoting axis AX (or called the rotating axis) of the second positioning component 120. That is, the center of curvature of each second arched positioning surface 1211 is the same as a center of curvature of the corresponding first arched positioning surface 1111.

Figure 4A:
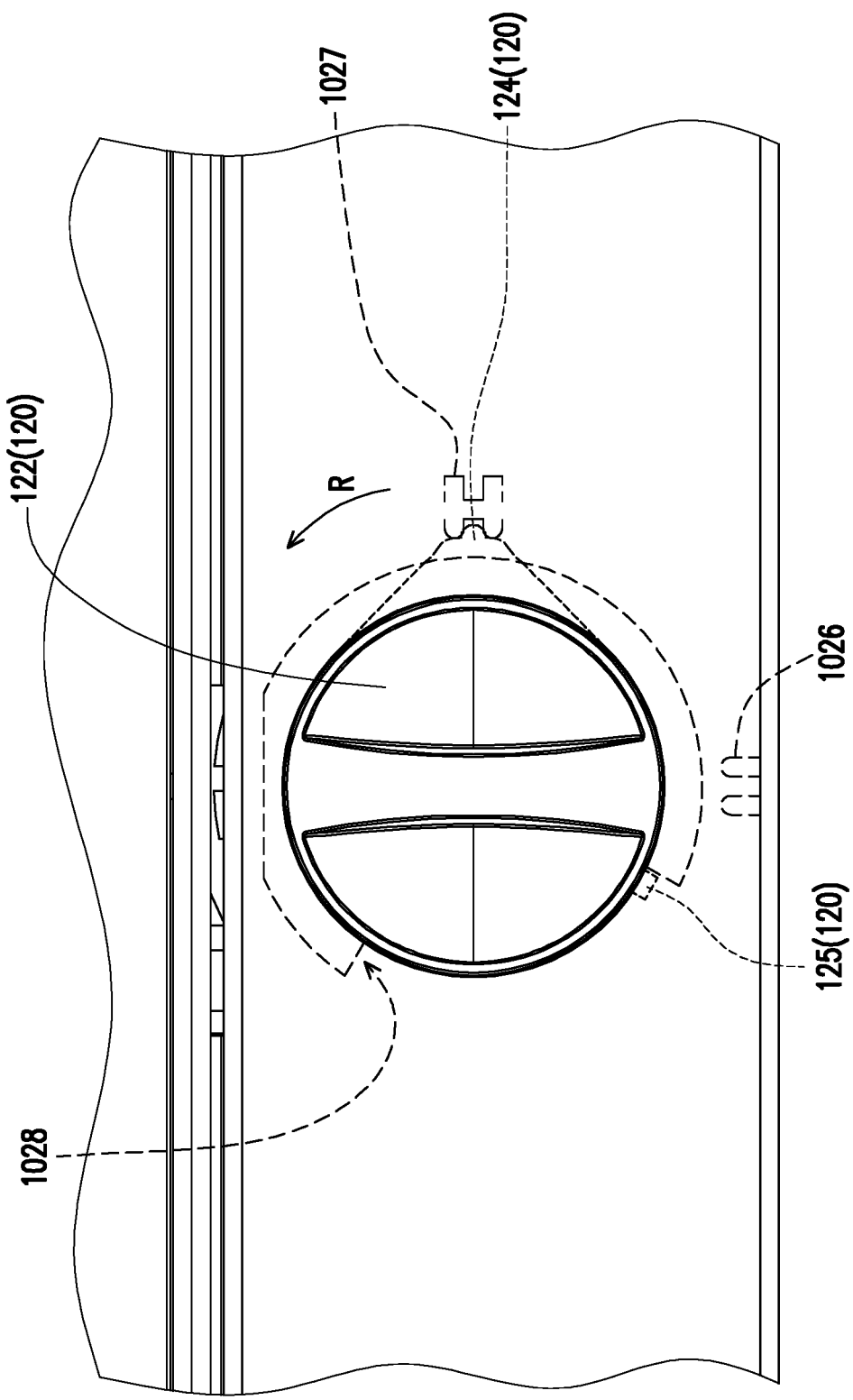
FIG. 4A is a schematic partially enlarged side view of the energy storage device of FIG. 3A in another state.
Figure 4B:
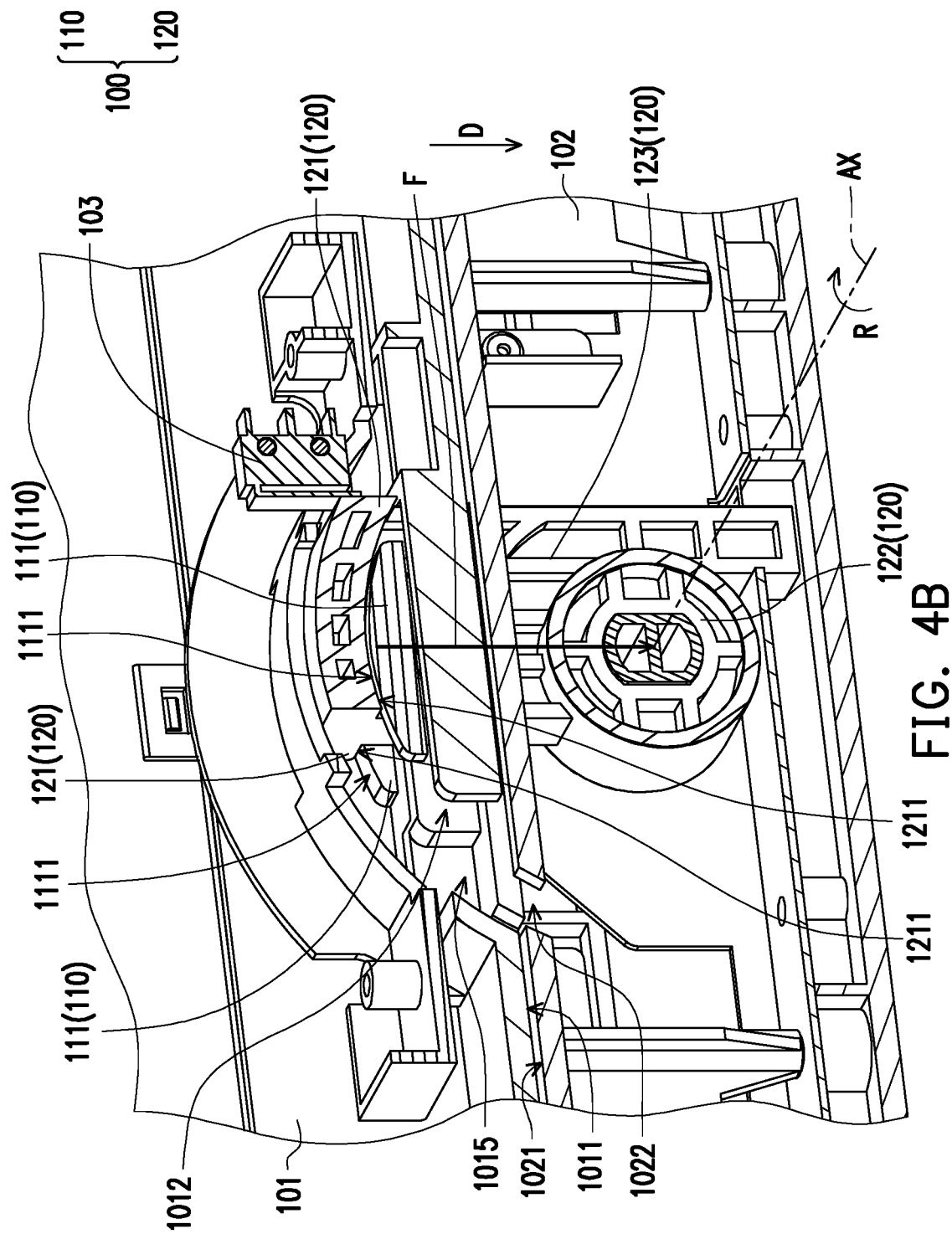
FIG. 4B is a schematic partially enlarged cross-sectional view of the energy storage device in another state of FIG. 3B in another state.

FIG. 4A is a schematic partially enlarged side view of the energy storage device of FIG. 3A in another state. FIG. 4B is a schematic partially enlarged cross-sectional view of the energy storage device in another state of FIG. 3B in another state. Referring to FIGS. 3A to 4B, in the embodiment, the second positioning component 120 further includes a knob 122 and an extending portion 123. The knob 122 is pivoted to the expanded power set 102 along the pivoting axis AX (or called the rotating axis) and connected with the two second arched positioning portions 121 through the extending portion 123. At least a portion of the knob 122 is exposed out of a side surface 1025 of the expanded power set 102 for user-friendly operation. The knob 122 shown in FIG. 3A is in an unlocked state, and the user may allow the knob 122 to switch to the locked state shown in FIG. 4A by rotating the knob 122 relative to the expanded power set 102 along a rotating direction R.

To prevent the knob 122 from rotating easily due to external forces, the second positioning component 120 further includes a first limiting portion 124 located in the expanded power set 102 and is, for example, a portion integrally formed with the knob 122 in the expanded power set 102. On the other hand, the expanded power set 102 includes two second limiting portions 1026 and 1027 that are disposed corresponding to the first limiting portion 124 and are, for example, integrally formed inside the expanded power set 102. Furthermore, the first limiting portion 124 and any of the two second limiting portions 1026 and 1027 may be a combination of an engagement protrusion and a groove. The first limiting portion 124 is configured to engage any of the two second limiting portions 1026 and 1027 to restrict a degree of freedom of rotation of the second positioning component 120 rotating relative to the expanded power set 102. When the first limiting portion 124 engages the second limiting portion 1026, the positioning structure 100 is in an unlocked state, as shown in FIG. 3A. Subsequently, the user needs to apply forces to the knob 122 to release the engagement between the first limiting portion 124 and the second limiting portion 1026 to allow the second positioning component 120 to rotate relative to the expanded power set 102 along the rotating direction R. At this time, the first limiting portion 124 moves toward the second limiting portion 1027. After the first limiting portion 124 engages the second limiting portion 1027, the second positioning component 120 stops rotating relative to the expanded power set 102 to switch the positioning structure 100 to a locked state as shown in FIG. 4A.

To prevent the second positioning component 120 from being overturned, the second positioning component 120 further includes a third limiting portion 125 located in the expanded power set 120 and is, for example, a portion integrally formed with the knob 122 in the expanded power set 120. On the other hand, the expanded power set 102 further includes a fourth limiting portion 1028. The third limiting portion 125 is, for example, a sliding block, and the fourth limiting portion 1028 is, for example, a sliding groove. The third limiting portion 125 is slidably disposed in the fourth limiting portion 1028. Two opposite dead points of the fourth limiting portion 1028 are configured to determine a rotary stroke of the second positioning component 120 rotating relative to the expanded power set 102. In other words, the second positioning component 120 stops rotating relative to the expanded power set 102 after the third limiting portion 125 abuts against any of the dead points of the fourth limiting portion 1028. In other embodiments, a third limiting portion may be a sliding groove, and a fourth limiting portion may be a sliding block. The disclosure is not limited to the embodiments.

Referring to FIGS. 3B and 4B, the two second arched positioning portions 121 and the extending portion 123 are aligned to the penetrating groove 1012. When a force applied to the knob 122 to make the knob 122 rotate relative to the expanded power set 102 along the rotating direction R, the two second arched positioning portions 121 and the extending portion 123 rotate relative to the expanded power set 102 with the knob 122 and move into the main power set 101 through the penetrating groove 1012. After the second positioning component 120 rotates to a predetermined position, at least a portion of the extending portion 123 passes through the penetrating groove 1012 to be located between the two first arched positioning portions 111 arranged side by side. The two second arched positioning portions 121 extending outward from two opposite sides of the extending portion 123 respectively moves to one side of the first positioning component 110. Furthermore, each second arched positioning portion 121 moves to one side of the corresponding first arched positioning portion 111 (e.g., above the first arched positioning portion 111), and the second arched positioning surface 1211 abuts against the first arched positioning surface 1111 of the first arched positioning portion 111.

A contour of the second arched positioning surface 1211 complements the corresponding first arched positioning surface 1111. Thus, each second arched positioning surface 1211 may completely match the corresponding first arched positioning surface 1111, and a contact area of each second arched positioning surface 1211 and the corresponding first arched positioning surface 1111 accounts for at least 40% of a surface area of the first arched positioning surface 1111. By increasing the contact area of each second arched positioning surface 1211 and the corresponding first arched positioning surface 1111, forces (e.g., the weight of the expanded power set 102) applied to the first positioning component 110 by the second positioning component 120 can be dispersed so as to prevent fractures in the second positioning component 120 and the first positioning component 110 caused by excessive concentration of forces. On the other hand, since a normal force F applied to the corresponding first arched positioning surface 1111 by each second arched positioning surface 1211 extends through the pivoting axis AX (or called the rotating axis) of the second positioning component 120, each second arched positioning surface 1211 may be firmly supported on the corresponding first arched positioning surface 1111, and is not easily detached from the corresponding first arched positioning surface 1111.

In the locked state shown in FIG. 4B, since each second arched positioning surface 1211 is stopped by the corresponding first arched positioning surface 1111, the second positioning component 120 may not move relative to the first positioning component 110 along a direction D. That is, a degree of freedom of movement of the second positioning component 120 in the direction D is restricted by the first positioning component 110. At this time, the expanded power set 102 may not be detached from the main power set 101 along the direction D. On the other hand, the energy storage device 100 further includes a switch 103 disposed in the main power set 101 and located at one side of the firs arched positioning portion 111. Furthermore, the switch 103 is disposed at one side of the penetrating groove 1012, wherein the penetrating groove 1012 has an entrance 1015 for the second arched positioning portion 121 to enter and exit the main power set 101, and the switch 103 is disposed opposite to the entrance 1015. After the switch 103 is triggered by the second arched positioning portion 121, the switch 103 sends a signal and the signal is transferred to the main power set 101 through the second electrical port 1024 (shown in FIG. 1) and the first electrical port 1014 (shown in FIG. 1). After the main power set 101 receives the signal, a function of power transmission is initiated to allow the expanded power set 102 to transport electricity to the main power set 101 and then allow the main power set 101 to transport electricity to an external device.

It should be particularly noted that although the second arched positioning surface 1211 of the second arched positioning portion 121 according to the embodiment does not abut against the first arched positioning surface 1111 of the firs arched positioning portion 111 completely, in other embodiments, it is possible to increase an area and a length of the second arched positioning surface of the second arched positioning portion to allow the second arched positioning surface of the second arched positioning portion to abut against the second arched positioning surface of the firs arched positioning portion completely. The disclosure is not limited the above embodiment.

In view of the foregoing, the energy storage device according to the disclosure includes the main power set and the expanded power set which can be fixed to each other through the positioning structure. According to the design and coordination of the arched contours of the first positioning component and the second positioning component in the positioning structure, it is possible to prevent the first positioning component and the second positioning component engaged with each other from being detached from each other to enhance the assembly reliability of the main power set and the expanded power set. Furthermore, the second arched positioning surface of the second positioning component may completely match the first arched positioning surface of the first positioning component, and the contact area of the second arched positioning surface and the corresponding first arched positioning surface accounts for at least 40% of a surface area of the first arched positioning surface. By increasing the contact area of second arched positioning surface and the first arched positioning surface, forces (e.g., the weight of the expanded power set) applied to the first positioning component by the second positioning component can be dispersed so as to prevent fractures in the second positioning component and the first positioning component caused by excessive concentration of forces. On the other hand, since the normal force applied to the corresponding first arched positioning surface by the second arched positioning surface extends through the pivoting axis (or called the rotating axis) of the second positioning component, the second arched positioning surface may be firmly supported on the corresponding first arched positioning surface and is not easily detached from the first arched positioning surface.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An energy storage device, comprising:
   a main power set;
   a first positioning component, disposed in the main power set, wherein the first positioning component comprises a first arched positioning portion having a first arched positioning surface;
   an expanded power set, configured to be assembled to the main power set; and
   a second positioning component, pivoted to the expanded power set, wherein the second positioning component comprises a second arched positioning portion having a second arched positioning surface,
   wherein the second positioning component is configured to rotate relative to the expanded power set such that the second arched positioning portion moves into the main power set and moves to one side of the first arched positioning component, wherein a contour of the second arched positioning surface complements a contour of the first arched positioning surface, and the second arched positioning surface abuts against the first arched positioning surface such that a degree of freedom of movement of the second positioning component in a direction is restricted by the first positioning component,
   wherein a center of curvature of the first arched positioning surface is the same as a center of curvature of the second arched positioning surface.

2. The energy storage device according to claim 1, a center of curvature of the first arched positioning surface and a center of curvature of the second arched positioning surface are located on a pivoting axis of the second positioning component.

3. The energy storage device according to claim 1, wherein the first arched positioning surface is a convex arc surface, and the second arched positioning surface is a concave arc surface.

4. The energy storage device according to claim 1, wherein a normal force applied to the first arched positioning surface by the second arched positioning surface extends through a pivoting axis of the second positioning component.

5. The energy storage device according to claim 1, wherein a contact area of the second arched positioning surface and the first arched positioning surface accounts for at least 40% of a surface area of the first arched positioning surface.

6. The energy storage device according to claim 1, further comprising:
   a switch, disposed in the main power set, wherein the switch is located on one side of the first arched positioning portion and configured to be triggered by the second arched positioning portion.

7. The energy storage device according to claim 1, wherein the second positioning component further comprises a knob and an extending portion, the knob is pivoted to the expanded power set and connected with the second arched positioning portion through the extending portion, and the extending portion is configured to rotate relative to the expansion power set with the knob such that at least a portion of the extending portion moves into the main power set.

8. The energy storage device according to claim 1, wherein the second positioning component further comprises a first limiting portion located in the expanded power set, and the expanded power set comprises two second limiting portions disposed corresponding to the first limiting portion, the first limiting portion is configured to engage any of the second limiting portions to restrict a degree of freedom of rotation of the second positioning component rotating relative to the expanded power set.

9. The energy storage device according to claim 8, wherein the second positioning component further comprises a third limiting portion located in the expanded power set, and the expanded power set further comprises a fourth limiting portion, wherein the third limiting portion is slidably disposed in the fourth limiting portion to determine a rotary stroke of the second positioning component rotating relative to the expanded power set.

10. The energy storage device according to claim 1, wherein the expanded power set has an accommodating trench configured to accommodate at least a portion of the second positioning component.

11. The energy storage device according to claim 1, wherein the main power set comprises a first electrical port, and the expanded power set comprises a second electrical port, the first electrical port and the second electrical port are configured to be combined with each other to electrically connect the main power set and the expanded power set.

12. The energy storage device according to claim 1, wherein the main power set comprises a first guiding portion, and the expanded power set comprises a second guiding portion, the first guiding portion and the second guiding portion are configured to be cooperated with each other to guide the assembly of the main power set and the expanded power set.

13. A positioning structure, comprising:
   a first positioning component, comprising a first arched positioning portion having a first arched positioning surface; and
   a second positioning component, disposed at one side of the first positioning component, wherein the second positioning component comprises a second arched positioning portion having a second arched positioning surface, the second positioning component is configured to rotate relative to the first positioning component, such that the second arched positioning portion moves to one side of the first arched positioning portion, wherein a contour of the second arched positioning surface complements a contour of the first arched positioning surface, and the second arched positioning surface abuts against the first arched positioning surface such that a degree of freedom of movement of the second positioning component in a direction is restricted by the first positioning component,
   wherein a center of curvature of the first arched positioning surface is the same as a center of curvature of the second arched positioning surface.

14. The positioning structure according to claim 13, wherein a center of curvature of the first arched positioning surface and a center of curvature of the second arched positioning surface are located on a rotating axis of the second positioning component.

15. The positioning structure according to claim 13, wherein the first arched positioning surface is a convex arc surface, while the second arched positioning surface is a concave arc surface.

16. The positioning structure according to claim 13, wherein a normal force applied to the first arched positioning surface by the second arched positioning surface extends through a rotating axis of the second positioning component.

17. The positioning structure according to claim 16, wherein a contact area of the second arched positioning surface and the first arched positioning surface accounts for at least 40% of a surface area of the first arched positioning surface.

\* \* \* \* \*